(12) United States Patent
Brandl (10) Patent No.: US 9,988,194 B2
(45) Date of Patent: Jun. 5, 2018

(54) GAS AND LIGHT PROOF, DOUBLE-SHELL BLISTER PACKS FOR MEDICINAL CONTENTS

(71) Applicant: AMCOR FLEXIBLES, Kreuzlingen (CH)

(72) Inventor: Oliver Brandl, Constance (DE)

(73) Assignee: Amcor Flexibles, Kreuzlingen (CH)

( * ) Notice: Subject to any disclaimer, the term of this patent is extended or adjusted under 35 U.S.C. 154(b) by 219 days.

(21) Appl. No.: 14/903,532

(22) PCT Filed: Jul. 8, 2014

(86) PCT No.: PCT/EP2014/064606
§ 371 (c)(1),
(2) Date: Jan. 7, 2016

(87) PCT Pub. No.: WO2015/004134
PCT Pub. Date: Jan. 15, 2015

(65) Prior Publication Data
US 2016/0159541 A1    Jun. 9, 2016

(30) Foreign Application Priority Data

Jul. 10, 2013 (EP) .................................... 13175849

(51) Int. Cl.
*B65D 83/04* (2006.01)
*B65D 65/38* (2006.01)
(Continued)

(52) U.S. Cl.
CPC .............. *B65D 65/38* (2013.01); *A61J 1/035* (2013.01); *B32B 7/12* (2013.01); *B32B 15/08* (2013.01);
(Continued)

(58) Field of Classification Search
USPC ............ 206/528, 529, 530, 531, 532, 534.1, 206/534.2, 535, 536, 538, 539, 524.1,
(Continued)

(56) References Cited

U.S. PATENT DOCUMENTS

| 5,011,019 A | 4/1991 | Satoh et al. |
| 2005/0139505 A1 * | 6/2005 | Miller ....................... B32B 3/28 206/528 |

(Continued)

FOREIGN PATENT DOCUMENTS

| DE | 102011001929 A1 | 10/2012 |
| EP | 0637285 B1 | 2/1995 |

(Continued)

OTHER PUBLICATIONS

Response to search report filed in Application No. PCT/EP2014/064606; 12 pages; dated Dec. 16, 2014.

*Primary Examiner* — Jacob K Ackun
(74) *Attorney, Agent, or Firm* — Reinhart Boerner Van Deuren P.C.

(57) ABSTRACT

The present invention is related to a double-shell blister packaging (1) for medicinal contents comprising one or more cavityies of a similar shape to the medicinal content, said double-shell packaging (1) being the assembly of a first and second mutilayer structures sealed to each other, each multilayer structure comprising a seal layer (3), one or more aluminium layers (4) with a thickness of at least 20 μm, preferably 30 μm, and two or more support layers (2), wherein said two or more support layers (2) have a tensile strength at break in machine and transversal direction of 200 N/mm² or more, and an elongation at break of 50% or more, preferably 70% or more, measured according to EN ISO (Continued)

527-3, each of said multilayer structures comprising cavities which, arranged face to face, enclose in use said medicinal content.

26 Claims, 4 Drawing Sheets (51) Int. Cl.
    *B32B 15/08*     (2006.01)
    *B65D 65/40*     (2006.01)
    *B65D 75/32*     (2006.01)
    *B65B 61/06*     (2006.01)
    *B65B 9/04*     (2006.01)
    *B32B 7/12*     (2006.01)
    *B32B 15/20*     (2006.01)
    *B32B 27/20*     (2006.01)
    *B32B 27/30*     (2006.01)
    *B32B 27/32*     (2006.01)
    *A61J 1/03*     (2006.01)
    *B65B 61/18*     (2006.01)
    *B65D 75/58*     (2006.01)

(52) U.S. Cl.
    CPC .............. *B32B 15/20* (2013.01); *B32B 27/20* (2013.01); *B32B 27/308* (2013.01); *B32B 27/327* (2013.01); *B65B 9/045* (2013.01); *B65B 61/06* (2013.01); *B65B 61/182* (2013.01); *B65D 65/40* (2013.01); *B65D 75/323* (2013.01); *B65D 75/5827* (2013.01); *B65D 75/5855* (2013.01); *B32B 2270/00* (2013.01); *B32B 2307/54* (2013.01); *B32B 2307/7242* (2013.01); *B32B 2439/80* (2013.01)

(58) Field of Classification Search
    USPC .................................. 206/524.6; 53/170, 173
    See application file for complete search history.

(56) References Cited

U.S. PATENT DOCUMENTS

| | | |
|---|---|---|
| 2010/0155288 A1 | 6/2010 | Harper et al. |
| 2014/0197066 A1 | 7/2014 | Brandl et al. |
| 2014/0346081 A1* | 11/2014 | Sowden ................. A61J 1/035 206/530 |
| 2015/0307260 A1* | 10/2015 | Reggio ................ B65D 75/585 206/531 |

FOREIGN PATENT DOCUMENTS

| | | |
|---|---|---|
| EP | 0650904 A1 | 5/1995 |
| EP | 1780005 A1 | 10/2005 |
| EP | 1733872 A1 | 12/2006 |
| WO | 2007/042174 A1 | 4/2007 |
| WO | 2007/057081 A1 | 5/2007 |

* cited by examiner

(a) Invention  (b) Prior art

GAS AND LIGHT PROOF, DOUBLE-SHELL BLISTER PACKS FOR MEDICINAL CONTENTS

FIELD OF THE INVENTION

The present invention is related to a high gas barrier and light proof, double-shell blister pack for medicinal contents, such as medication and analogous pharmaceutical products. The present invention also discloses a process for the production of this blister pack.

STATE OF THE ART

Blister packs are well known by those skilled in the art. They are produced on blister lines for the pharmaceutical industry to pack for example tablets and capsules by forming a packaging film to a cavity form, filling the tablet and sealing it by a lidding foil. If no gas barrier is needed, in particular no aluminum layer, usual films such as (PVC, PVDC/PVC, PP, PS, etc.) are easily thermoformable and constitute the bottom film of a single-shell blister in which cavities of a large variety of sizes can be thermoformed.

Figure 1:
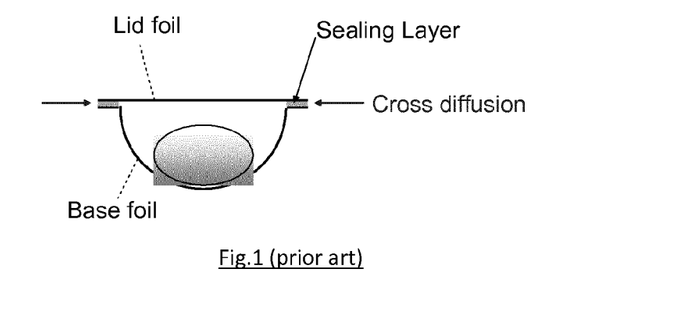
FIGS. 1 to 3 are schematic representations of the cross-diffusion phenomenon in single-shell blister pack according to the prior art. Since such single-shell packaging for medicinal contents have a lid and a shell both comprising aluminium layer, no other diffusion than cross-diffusion is possible.
Figure 2:
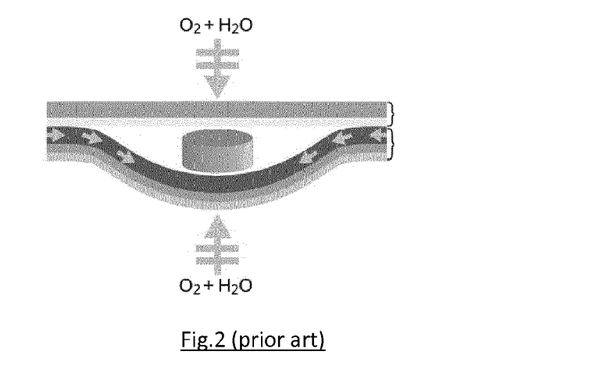

U.S. Pat. No. 5,011,019 discloses a single-shell blister pack with lid comprising an aluminium layer (FIG. 1) and a double-shell (FIG. 2) blister packaging without aluminium barrier layer. The plastic film is heated and formed by air pressure or by a plug to form the cavity by press-trough process (PTP). Since no aluminum layer is present here, high forma bilities can be achieved leading to a small blister size.

For blister packaging with total gas and light barrier requirements, laminates with an aluminum layer are required. The presence of such an aluminum layer considerably limits the depth of the cavities in a deep-drawing process since the elongation-at-break is conditioned by this aluminum layer. Therefore, a process called "stretch cold forming" is used. In this process, the periphery of a future cavity is maintained in place by clamping while the cavity is deep-drawn.

For single-shell blister packs with aluminum layer, it is state of the art that the bottom foil is formed and the lid foil is unformed. Forming tools form the Al laminate according to a cold forming process by means of plugs and a clamping. The multiaxial deformability is nevertheless limited. Single-shell blisters of this type are notably disclosed in EP 1 780 005 B1, EP 1 733 872 A1, WO 2007/042174 A1, WO 2007/057081 A1 and US 2010/0155288 A1.

A well-known example of a single-shell blister pack according to the prior art has the following structure: polyamide (PA) 25 μm/Al 45 μm/PVC 60 μm. This structure can be multiaxially stretch-coldformed by about 30%.

EP 0 637 285 B1 discloses a stretch-formed single-shell blister pack for freeze drying applications with a plurality of compartments made from a stretch-formable multilayer structure comprising a metal layer of 8 to 80 μm and a plastic support layer of biaxially oriented polyamide on each side having a thickness between 20 and 30 μm. The lid is not stretch-formed and comprises an aluminium layer from 15 to 25 μm. The blister pack is aimed for a process where a liquid is poured into the cavity and freeze dried, which requests a high resistance against temperature differences without curling and suggests the use of symmetrical film structures.

DE 102011001929 (Amcor) discloses a single-shell blister packaging using amorphous PET of a preferred thickness between 200 and 300 μm and a tensile strength at break much lower than 200 N/mm$^2$ (MPa). Typical non-oriented PET (A-PET) for thermoforming exhibits a tensile strength at break between 55 and 75 N/mm$^2$ (MPa) to allow thermoformability —see http://en.wikipedia.org/wiki/Polyethylene terephthalate. Furthermore, the multilayer structures disclosed in DE 102011001929 do not have two or more support layers of oriented polymer layer with a tensile strength at break higher than 200 N/mm$^2$ (MPa), and in particular no aluminum layer sandwiched between those support layers.

AIMS OF THE INVENTION

The present invention aims to provide a double-shell packaging for medicinal contents exhibiting a total light barrier and a high gas barrier, wherein the only gas diffusion is limited to the edges.

The present invention also aims to optimize the size of the double-shell packaging by considerably reducing the ratio film laminate versus medicinal content by adapting the double-shell cavity size closely to the capsule or tablet size, thereby reducing the global size of the blister packaging and of the over-packaging with a logical positive effect on the global $CO_2$ balance.

The present invention further provides a process for the production of a space-efficient double-shell blister according to the invention.

SUMMARY OF THE INVENTION

The present invention discloses a double-shell blister packaging for medicinal contents comprising one or more cavity(ies) of an optimized shape for the medicinal content, said double-shell packaging being the assembly of a first and a second multilayer structures sealed to each other via one or more seal layer(s), each multilayer structure comprising one or more aluminum layer(s) with a thickness of at least 20 μm, preferably 30 μm, and two or more support layers, wherein said two or more support layers have a tensile strength at break measured in machine and transversal direction of 200 N/mm$^2$ or more, and an elongation at break of 50% or more, preferably 70% or more, measured according to EN ISO 527-3 published in 1995; sample type 2, part 1-6, each of said multilayer structures comprising cavities which, arranged face to face, enclose in use said medicinal content.

Particular embodiments of the present invention comprise one or more of the following features:

- the one or more aluminium layer(s) is/are sandwiched between the two or more support layers;
- the ratio of the volume of the cavity to the volume of the medicinal content is comprised between 1.8 and 1, preferably between 1.6 and 1.1, and most preferably between 1.5 and 1.2;
- the stress/strain curves measured on said support layer present a positive slope for the measurement of the strain hardening according to EN ISO 527-3 published in 1995, sample type 2, part 1-6;
- the thickness of the one or more aluminium layer(s) within the one or more cavity(ies), due to the stretch-coldforming process, represents at least 30% of the thickness of the one or more aluminium layer(s) in the multilayer structure in the periphery of said cavities;
- the blister is of a tearable push-through or a peelable type comprising one or more seal layer(s) selected from the group consisting of heat-seal lacquer with a thickness of 15 μm or less, preferably 10 μm or less, a seal-initiation temperature determined by welding trials of 125° C. or less, preferably 110° C. or less, and a melting temperature determined by differential scanning calorimetry of 125° C. or less, preferably 120° C. or less, and most preferably of 115° C. or less, measured under a heating speed of 20° C./min between 50 and 150° C. and represented by the peak maximum of the second run;

the blister is of a tearable push-through or a peelable type comprising one or more seal layer(s) comprising coextruded polymer films and extrusion coatings with a thickness of 50 µm or less, preferably 35 µm or less, a seal-initiation temperature determined by welding trials of 135° C. or less, preferably 120° C. or less, and a melting temperature determined by differential scanning calorimetry of 135° C. or less, preferably 125° C. or less, and most preferably of 115° C. or less, measured under a heating speed of 20° C./min between 50 and 150° C. and represented by the peak maximum of the second run;

the seal layer for the peelable blister has a peel strength comprised between 2 and 10 N/15 mm;

the seal peelable seal layer comprises LLDPE, poly-1-butene and inorganic filler material;

the seal layer for the tearable blister type is selected from the group consisting of a linear low-density polyethylene of a density between 0.902 and 0.925 g/cm$^3$, partially or entirely neutralized ionomer, EMA, EBA, polyethylene obtained by metallocene catalysis, ethylene vinyl acetate, polyethyleneterephtalate glycol;

the peelable seal layer for the peelable blister type comprises compositions selected from the group consisting of polyolefin blends and/or copolymers of modified ethylene acrylate, blends of linear low-density polyethylene or polyethylene obtained by metallocence catalysis and polybutylene;

the peelable seal layer for the peelable blister comprises lacquer compositions selected from the group consisting of phenoxy resins, blends of copolymers of methacrylic ester, olefins and ethylidennorbornen as binder, blends of polybutylmetacrylate, polybutyl-ethacrylate and acrylic resins as binder, tackifier based on alphamethylstyrene, maleic acid anhydride modified copolymers of vinylacetat and vinylchloride and water-based dispersions based on ethylenevinylacetate, ethylene acrylic acid and metacrylic acid and salts thereof;

said multilayer structures additionally comprise two or more adhesive or tie layers selected from the group consisting of EAA, ionomers, EMA and EBA.

The present invention further discloses a process for the manufacturing of the blister packaging according to the invention, comprising the following steps:

supplying a first and second multilayer structures comprising one or more aluminium layer(s) with a thickness of at least 30 µm and two or more support layers, said multilayer structures having a multidirectional deformability of 35% or more;

stretch-cold forming of said first and second multilayers to form one or more cavity(ies);

filling said one or more cavity(ies) of one of the first or second multilayer structure with the medicinal content;

sealing the first and second multilayer structures face to face;

cutting the sealed multilayer into blister packaging units;

conditioning in over-pack boxes or bags.

The process according to the invention may comprise an additional step of cutting a weakening line or a tear notch into the first and/or second multilayer structure(s) to allow a push-through opening or a tear opening.

KEY

1. Double-shell blister pack
2. Support layer
3. Seal layer
4. Aluminum layer
5. Medicinal content
6. Forming station
7. Filling station
8. Sealing station
9. Cutting station
10. Packing station

DETAILED DESCRIPTION OF THE INVENTION

Tablet blisters are produced on blister lines for the pharmaceutical industry to pack a medicinal content, for example tablets and capsules, by forming a multilayer packaging film to a cavity form, filling the medicinal content and sealing it by a lidding foil. The presence of an aluminium layer with a thickness of at least 30 µm within the multilayer of the bottom and of the lidding foil guarantees a total gas and light barrier, if necessary.

The expression "medicinal content" in the present invention has to be understood in its largest sense and comprises tablets, pills, capsules but also contents which are not strictly considered for medical use but requesting a high gas barrier.

A first target of the present invention is to create a double-shell gas-tight blister, comprising an aluminium barrier layer of at least 20 μm, preferably 30 μm, with a comparable cavity size as an ordinary double-shell thermoform blister (without aluminium layer as gas and light barrier).

To reach this target, the present invention uses a multilayer laminate comprising an aluminium layer with an increased multiaxial deformability of at least 35%, preferably of at least 40%. Two multilayer structures with increased multiaxial deformability can be cold-formed (stretch-cold forming) creating cavities in each part (top and bottom) that are arranged symmetrically to each other, those cold-formed parts being assembled by sealing after having been filled with their medicinal content. The size of such a double-shell configuration is considerably reduced compared to a single shell with a flat lid. The requested quantity of multilayer structure can be reduced by at least 50%, and preferably by at least 70%—see FIG. 5 and Table 2. The size of the cavity is optimized and just slightly bigger than the size of the medicinal content by about 5 to 60%, preferably 10 to 40% and more preferably 10 to 30%.

Figure 8:
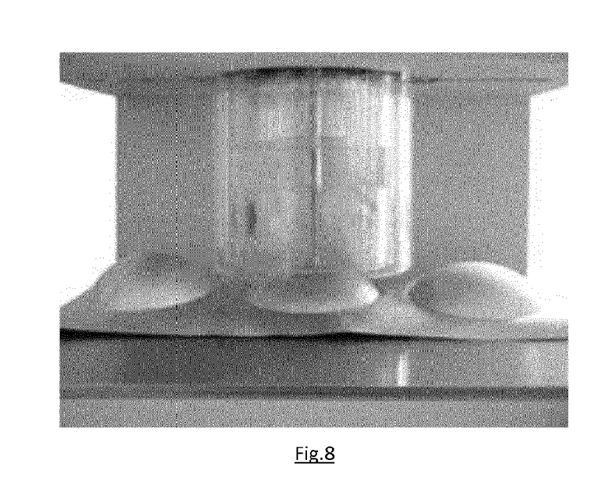
FIG. 8 represents a burst pressure test of the multilayer structure used for the double-shell blister according to the present invention.

A burst test to test multiaxial deformability is performed by preparing a strip with a width of 20 cm out of the multilayer structure, which is introduced under a calotte, in case of bursting during the test, the testing time has to be adjusted and the tests have to be repeated over the whole width of the strip. The measured values have to be averaged and the standard deviation is being calculated (see FIG. 8).

The good formability of a standard cold-formed multilayer structure is achieved by supporting the weakest layer in the laminate, i.e. the aluminium foil, by means of at least two strong plastic layers. Oriented polyamide (oPA) film of 25 μm is generally used for that purpose as well as other plastics having a tensile strength at break in machine transversal direction of at least 200 N/mm$^2$ and an elongation at break of at least 50%, preferably at least 70%, measured according to EN ISO 527-3 published in 1995, sample type 2, parts 1-6.

The present invention discloses the use of at least two or more of such stiff polymer films, either both on one side of the aluminium layer or sandwiching the aluminium layer.

Non-limitative examples of such stiff polymer layer are oriented polymer layer such as oPET's (>230 MPa in MD and TD), oPPS, oPS, oEVOH, or non-oriented aromatic polyamides (aramid) or PEEK. Preferred polymers are specific polyamide formulations developed for higher stiffness applications. An example for a typical structure of a final laminate according to the invention is (tie or adhesive layers are not mentioned here):

oPA 25 μm (outside)/Al 60 μm/oPA 25 μm/PETG 35 μm (inside)

In this structure, oPA works as support layer, aluminium as barrier layer and PETG as seal layer.

The use of such relatively thick multilayer structures requests high sealing temperatures on the jaws since the heat has to cross several layers before it reaches the seal layer. This creates a phenomenon called the "Hot Tack Issue" where the air in the cavity is overheated, thus increasing the pressure in the cavity. At that stage, the seal layer is still molten and air penetrates the periphery of the cavity leading to a poor seal and cross-diffusion barrier.

To overcome this problem, high-viscosity melt at the necessary seal temperature is needed. The most convenient seal layers are therefore combinations of a low seal temperature and high molecular weight, (high viscous seal layer), as thin as possible to avoid an insulation effect.

Non-limitative examples for such films are PETG 35 μm, various LLDPE versions with densities between 0.902 and 0.925 g/cm$^3$ or multilayer films based on it, as well as ionomers films/coatings. High MW lacquers or thin coatings (1-10 μm) are possible alternatives (see examples) as seal layer as well as highly mineral filled coatings since they have a high-melt viscosity. The key features for sealing layer are melting point determined by DSC and seal-initiation temperature which should be lower than 125° C., preferably lower than 120° C. and even lower than 115° C. if possible.

To determine the seal-initiation temperature (SIT), seal trials are started at a temperature low enough to avoid any seal (seal strength=0 N/15 mm), then the temperature is progressively increased (5 or 10° C. steps) and when a seal occurs, the strength is measured and the SIT is considered as determined above 2 N/15 mm seal strength.

The double-shell blister packaging according to the invention needs an opening mechanism chosen between peeling, pushing-through or tearing.

The tear-open solution can be achieved by the use of appropriate plastic that breaks easily and thin enough Al layers. Such plastic structures are mostly oriented or intrinsically brittle. As non-limitative examples, mention may be made of PETG, oPA, oPET, etc.

Another option to achieve "easy tear" is specific weakening by laser-cutting (in distinct areas and trough specific layers only) or mechanically (punching/scratching at specific area into specific layers only) at the blister production line after forming or during the laminate production process. These techniques are well known by those skilled in the art.

The peelable solution often uses seal layer composed of a matrix polymer and a dispersed-phase inorganic or organic material, that substantially weakens the cohesive strength leading to an easy opening. Well-known examples are e.g. polyethylene blended with poly-1-butene (PE/PB-1) or polyethylene with talcum added. For lacquers, debonding agents are used but adhesively-failing structures can possibly be used.

The peel and seal strength is given in N/15 mm. The test procedure generates a cross seal at appropriate temperature using sealing jaws of 10 mm, the sealing pressure is 50 N/cm$^2$, +/−2 N/cm$^2$, sealing time 0.5 sec. To measure the peel or seal force via a testing machine, the test velocity is 100 mm/min and the takedown angle 90°.

The push-through solution needs to take care on the tablet, which should not break, and therefore needs a cavity that must be sufficiently weak or breaking easily. This is an opposite requirement to the high-strength demand to achieve exceptionally high formability. Therefore, the push-through design feature can be achieved after forming, i.e. on the blister line. Laser ablation/cutting can be used to weaken the layers or scratching/punching can again be used to weaken the laminate in a certain region/area, enabling easy breaking of the laminate when pushing the tablet through.

Another advantage of the present invention is the sustainability of the double-shell blister pack since "thick" laminates lead to a higher $CO_2$ emission than thin foils and one would expect a worse $CO_2$ emission balance per square meter for the structures according to the invention than for the combinations used in a standard single-shell blister as they are thicker and heavier. Nevertheless, the blister pack according to the invention can pack up to 75% more tablets or capsules, as the cavity area size is up to 75% smaller leading to a better $CO_2$ emission balance than for prior-art blisters (see Table 2).

Another aim of the present invention is to considerably reduce the so-called cross-diffusion. Cross-diffusion is the moisture and gas entering the cavity by diffusion through the seal layer (see FIGS. 1 to 3). Humidity is an important issue in pharmaceutical applications. Table 1 shows calculated cross-diffusions based on the available perimeter of the cavity of a blister pack conditioned by a double-shell configuration. The single-shell blister bottom foil with same inner side as the double-shell blister bottom foil and the lid of the prior art is taken as 100% reference for the respective example.

Figure 3:
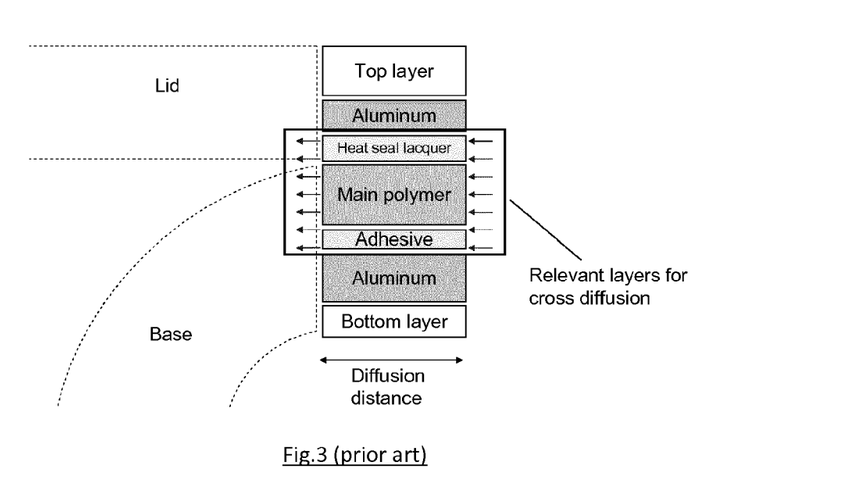
Figure 4:
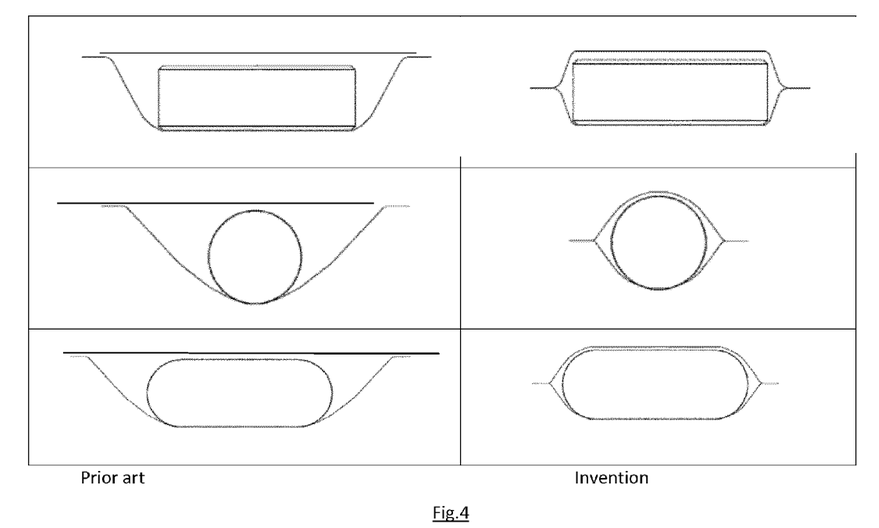
FIG. 4 represents the comparisons between single-shell blister packs of the prior art and double-shell blister packs according to the invention. Due to stretch-cold forming, the global size of the blister pack can be considerably reduced.
Figure 5:
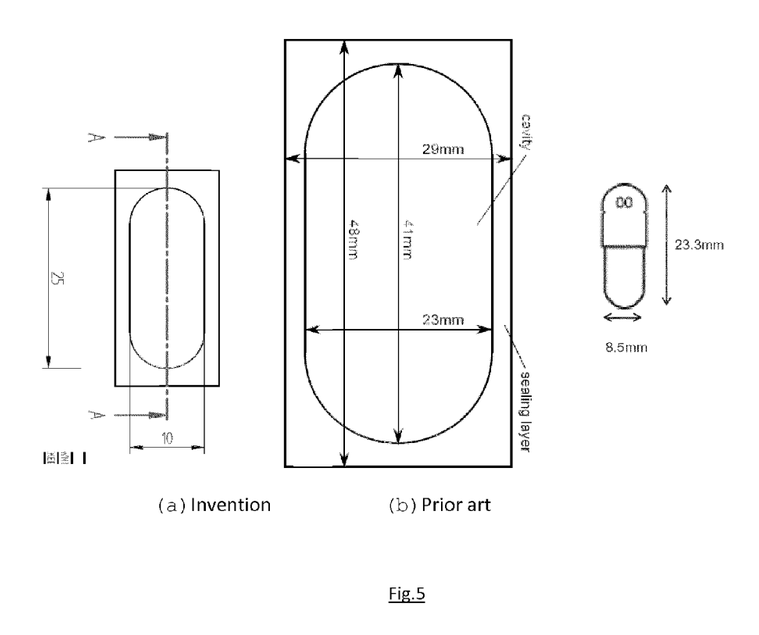
FIG. 5 represents a top view of the dimensions between a prior art single-shell pack with lid (b) for a capsule 00 which is 23.3 mm long with a diameter of 8.5 mm (which was taken as reference for the calculations in Table 2) and the dimension of the double-shell pack according to the invention (a).
Figure 6:
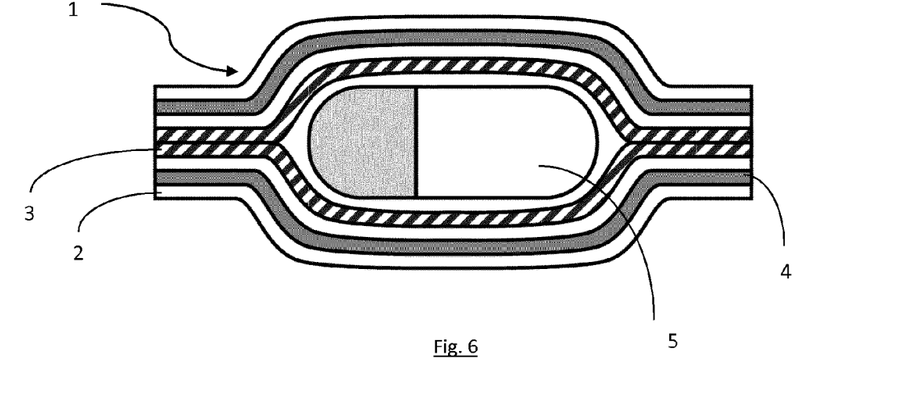
FIG. 6 represents a first configuration of the double-shell blister pack according to the invention, wherein the medicinal content (a capsule 00) is packed in a double-shell structure where the aluminium layer is situated between two support layers and one seal layer. The adhesive, primer or extrusion coated tie layers are not represented.
Figure 7:
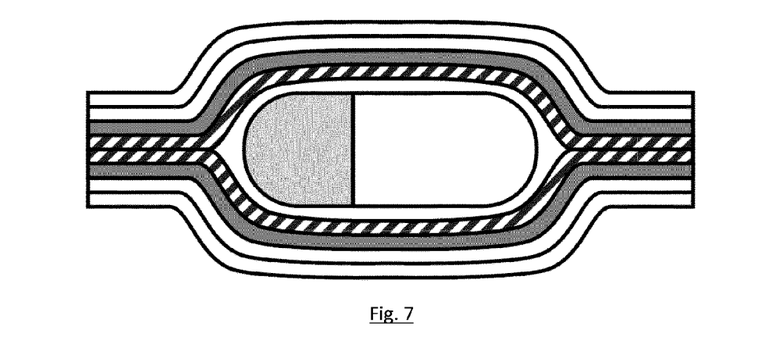
FIG. 7 represents a second configuration of the double-shell blister pack according to the invention, wherein the medicinal content (a capsule 00) is packed in a double-shell structure where the aluminium layer is sandwiched between two support layers. Again, the possible adhesive, primer or extrusion coated tie layers are not represented.

The calculations take into account the water-vapor transmission coefficients (g/m²/day) of the individual layer of the bottom and the lid foil on the inner sides (IS and sealing side of the Al foil)-see relevant layer for cross-diffusion in FIG. 3. The calculation also takes into account the thickness of these individual layers and the available perimeter relative to a single-shell blister pack with lid (perimeter where humidity may enter the cavity by cross diffusion). FIG. 5 and Table 2 allow the calculation of the perimeter that represents about 55% of the perimeter of a single-shell cavity.

Figure 9:
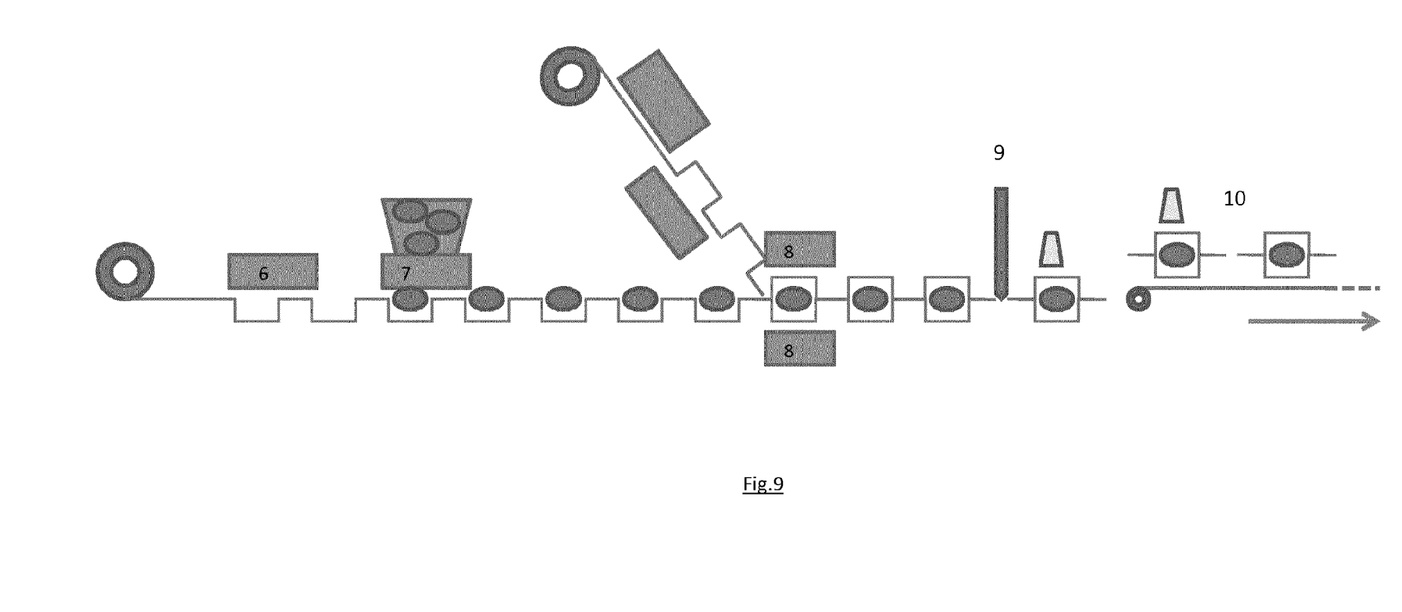
FIG. 9 represents the process scheme for the production of the double-shell blister according to the invention.

The double-shell example B (PA25/PA25/Al/PE) achieves a cross-diffusion reduction of 27% compared to the single-cavity blister example B of the prior art. Important is the reduction in perimeter, where the cross-diffusion enters the cavity, by reduction of the blister-cavity size and minimizing the thickness of the seal layer. This is achieved by reducing the blister-cavity size and subsequently the perimeter through which cross-diffusion occurs by using an Al laminate with increased multidirectional deformability (approximately 40%) and by forming both lid and bottom foil creating a double-shell according to the invention. The cavities are formed in a blister line forming both lid and bottom foil. A scheme of a blister line for that purpose is shown in FIG. 9.

The most important difference to a usual blister line is the second forming station for the lid and the possible presence of a second sealing station to heat the multilayer structure from both sides.

Further advantages of the present invention are:
less space in shelf/less volume consumed in the shelves;
less secondary costs (smaller folding carton, less air transported in truck);
higher line productivity (more tablets packed per minute);
smaller in the pocket of a patient.

The extremely low cross-diffusion rate of this type of packaging is evaluated at approximately $1.4*10^{-6}$ g water-vapor/day. On the contrary, the best thermoform blister typically has a cross-diffusion rate of approximately. $1*10^{-4}$ g water/day entering the cavity under 40° C./75% relative humidity outside of the blister and 40° C./0% rh. inside, wherein the blister tablet is considered as an infinite water absorption sink.

This low quantity of water-vapor diffusion is difficult to measure and it can only be performed by using several blisters having several cavities over long periods of time (half a year for example, 10 blisters with 10 cavities). Then, a difference of 0.1 mg can be measured. Examples: 1.4*10-6*10 blisters*10 cavities*183 days (half year)=0,026 g in half a year. And 1.83 g for the thermoform case, which corresponds to half a year at 40/75, is a typical storage condition for pharmaceutical companies (so called ICH conditions).

For the aluminium layer, soft temper types are used as multidirectional stretchability is required. Non-limitative exemples are: EN AW 8006, EN AW 8021, EN AW 8021A, EN AW 8021B, EN AW 8014.

The above-mentioned Al alloys can be milled, and after soft tempering, their elongation at break is above 8% and tensile strength is above 60 MPa. The surface of the Al foil must be homogeneous and free of oil. Optionally, the surface of the aluminium foil can be surface treated (corona, plasma, chemically, primer, washed with solvent MEK). The alloy should be fine grained with small and uniform grain sizes, there should be more than five, preferably seven, grain layers above each other across the thickness.

The so-called support layers are specific plastic layers which, due to their intrinsic stiffness or thickness, reach a tensile strength at break above 200 N/mm² in machine and transversal direction, and an elongation/strain at break above 50% in machine and transversal direction. Furthermore, the strain hardening should have a substantially positive slope in the corresponding technical stress/strain curves. The determination of the tensile strength and elongation at break as well as technical stress/strain curves is performed by a (Zwick/Instron) tensile testing machine according to EN ISO 527-3 1995, sample type 2, part 1-6.

EXAMPLES

The following tables show examples of typical structures according to the invention for top and bottom of peelable double-shell blisters (examples 1 to 6) and tear-open blisters (Examples 7 to 12). The commercial types of the polyurethane adhesives, primer, and coextruded tie layer as well as the support layer and the seal layers are specified below.

PP MAH is Orevac® 18750 from Arkema (MAH=maleic acid anhydride grafted polypropylene)
PE MAH is Plexar® 3243 from Equistar (MAH grafted LLDPE, linear low density polyethylene)
PI (polyimide) is Kapton® from DuPont™
oPPS (oriented polyphenylenesulfid) is Torelina ® 3030 from Toray
Aramid is Mictron® from Toray; aramid is aromatic polyamide
PVC is Perlalux mono 60 H from Perlen Packaging; PVC is polyvinylchloride
Coex film Rayopeel P med® from Amcor Flexibles Gent-Extrusion with LDPE, LLDPE and PB-1 as peelable component used for medical applications
oPA is Honeywell Capran® Emblem(TM) 2500 (bi-axially oriented film of nylon 6)
oPET is Mylar® 813 from Du Pont (bi-axially oriented film of polyethyleneterephtalate)
PETG film is Amcor Flexibles Gent-Extrusion Rayopet G® film, based on Eastar 6763 from Eastman
Peelable PETG film from Amcor Flexibles Gent-Extrusion according to EP2540492
Cast coextruded PP film with a Borealis C2,C4 PP ter-polymer TD215BF (MI=6 and melt temperature=130° C.) sealant layer and a Borealis homo PP HD214C melt index=8 and melt temperature=162° C.) layer, with a layer ratio ter-polymer/homo polymer (1/2)
Blown coextruded PE film with a Dex Plastomers C8-based mVLDPE Exact0201FX (density 0.902, melt index=1.1 and melt temperature=96 ° C.) sealant layer and an ExxonMobil C4-based LLDPE 1001XV (density 0.918, melt index=1.0 and melt temperatures at 111° C. and 122° C.) layer, with a layer ratio (1/3)
Peelable seal lacquer is composed of 5% Dow Ucar™ VMCH, 25% Degalan N80 from Evonik and 70% solvent methylethylketone (MEK)
Tight seal lacquer is 7% Dow Ucar™ VMCH, 18% Evonik Degalan P24 and 75% MEK PU adhesive is Henkel Liofol® 6800 1.5%, Henkel Liofol® 3640 75% and 23.5% solvent ethylacetate
PU Primer is Luphen® 700, a water-based polyester PU elastomer dispersion from BASF (The lacquers, primers and adhesives are applied with roller coating, solvent is evaporated in a drying oven). The lamination step of the examples is achieved by extrusion lamination or solvent-based adhesive lamination.

The layer thickness and weight of the various examples is reported in the following tables

| Peelable blister | (μm) | (g/m²) | (μm) | (g/m²) | (μm) | (g/m²) | (μm) | (g/m²) | (μm) |
|---|---|---|---|---|---|---|---|---|---|
| Ex. 1 | oPA 25 | PU adhesive 3 | oPA 25 | PU adhesive 5 | AI 8021B 45 soft | PU adhesive 3 | PVC 60 μm | | |
|  | oPA 15 | PU adhesive 3 | oPA 25 | PU adhesive 5 | AI 8021B 45 soft | Peelable seal lacquer 5 gsm | | | |
| Ex. 2 | oPA 25 | PU adhesive 3 | oPA 25 | PU adhesive 3 | AI 8021B 70 soft | Coex coating Dow Primacor 3003 (EAA) 5 gsm and Appeel 72D811 (EMA) 10 gsm | | | |
|  | oPA 25 | PU adhesive 3 | oPA 25 | PU adhesive 3 | AI 8021B 70 soft | Coex coating Dow Primacor 3003 (EAA) 5 gsm and Appeel 72D811 (EMA) 10 gsm | | | |
| Ex. 3 | oPet 23 | Extr. coating PE-MAH 7 | oPET 23 | Extr. coating PE-MAH 7 | AI 8021B 45 soft | Extr. coating PP-MAH 7 | oPA 15 | Extr. coating PP-MAH 7 | PPter/PPh sealant film 30 |
|  | oPet 23 | Extr. coating PE-MAH 7 | oPET 23 | Extr. coating PE-MAH 7 | AI 8021B 45 soft | Extr. coating PP-MAH 7 | oPA 15 | Extr. coating PP-MAH 7 | PPter/PPh sealant film 25 |
| Ex. 4 | oPPS 38 | PU adhesive 4 | AI 8079 60 soft | PU adhesive 4 | oPPS 38 | PU adhesive 3 | Peelable PETG 35 | | |
|  | oPPS 38 | PU adhesive 4 | AI 8079 60 soft | PU adhesive 4 | oPPS 38 | PU adhesive 3 | Peelable PETG 35 | | |
| Ex. 5 | Aramid 12 | PU adhesive + PU primer 5 | AL 8079 80 soft | PU Primer + PU adhesive 5 | Aramid 12 | PU adhesive 3 | Rayopeel P med 35 | | |
|  | Aramid 12 | PU adhesive + PU primer 5 | AL 8079 80 soft | PU Primer + PU adhesive 5 | Aramid 12 | PU adhesive 3 | Rayopeel P med 35 | | |
| Ex. 6 | oPA 25 | PU adhesive + PU primer 5 | AL 8021B 60 soft | PU Primer + PU adhesive 5 | oPA 25 | PU adhesive 3 | Rayopeel P med 35 | | |
|  | oPA 25 | PU adhesive + PU primer 5 | AL 8021B 60 soft | PU Primer + PU adhesive 5 | oPA 25 | PU adhesive 3 | Rayopeel P med 35 | | |

| Tear Open Blister | (μm) | (g/m²) | (μm) | (g/m²) | (μm) | (g/m²) or (μm) | (μm) |
|---|---|---|---|---|---|---|---|
| Ex. 7 | oPA 25 | PU adh. 3 | oPA 25 | PU adh. 5 | AI 8021B soft 40 | PU adhesive 3 | PVC 30 μm |
|  | oPA 15 | PU adh. 3 | oPA 25 | PU adh. 5 | AI 8021B soft 40 | Tight sealing lacquer 5 | |
| Ex. 8 | oPA 25 | PU adh. 3 | oPA 25 | PU adh. 3 | AI 8021B soft 45 | Ionomer extr. coating Du Pont Surlyn 1652 15 gsm | |
|  | oPA 25 | PU adh 3 | oPA 25 | PU adh. 3 | AI 8021B soft 45 | | |
| Ex. 9 | oPet 15 | PU adh3 | oPET 15 | PU adh. 5 | AI 8021B soft 45 | PU adh. 3  oPET 15 μm  PU adh. 3 | mVLDPE/C4LLDPE sealant film 30 μm |
|  | oPet 15 | PU adh 3 | oPET 15 | PU adh. 5 | AI 8021B soft 45 | PU adh. 3  oPET 15 μm  PU adh. 3 | mVLDPE/C4LLDPE sealant film 30 μm |
| Ex. 10 | PI 25 (polyimid) | PU adh 4 | AI 8079 soft 35 | PU adh. 4 | PI 25 | PU adh. 3 | Rayopet G 35 |
|  | PI 25 | PU adh 4 | AI 8079 soft 35 | PU adh. 4 | PI 25 | PU adh. 3 | Rayopet G 25 |
| Ex. 11 | oPA 25 | PU adh + PU prim. 5 | AL 8021B 40 soft | PU Primer + PU adh. 5 | oEVOH 15 | PU adh. 3 | LLDPE Extrusion Coating Dow Elite 5811 10 gsm |
|  | oPA 25 | PU adh + PU prim. 5 | AL 8021B 40 soft | PU Primer + PU adh. 5 | oEVOH 15 | PU adh. 3 | LLDPE Extrusion Coating Dow Elite 5811 10 gsm |
| Ex. 12 | oPA 25 | PU adh + PU primer 5 | AL 8021B 60 soft | PU Primer + PU adh. 5 | oPA 25 | PU adh. 3 | Rayopet G 30 |
|  | oPA 25 | PU adh + PU primer 5 | AL 8021B 60 soft | PU Primer + PU adh. 5 | oPA 25 | PU adh. 3 | Rayopet G 30 |

TABLE 1

| Type of blister | "Bottom" structure seal layer 1 | "Lid" structure seal layer 2 | Water vapor transmission (g/m²/day) Layer 1 | Water vapor transmission (g/m²/day) Layer 2 | Thickness seal layer (μm) Layer 1 | Thickness seal layer (μm) Layer 2 | Total WVTR (g/day) | Seal perimeter (%)* | Cross diffusion (%)* |
|---|---|---|---|---|---|---|---|---|---|
| Single-shell blister A | PA25/AI45/PVC60(IS) | AI20/HS7(IS) | 0.3 | 2.8 | 60 | 7 | 0.0376 | 100 | 100 |
| Double-shell blister A | PA25/PA25/AI60/ PVC60(IS) | PA25/PA25/AI60/ PVC60(IS) | 0.3 | 0.3 | 60 | 60 | 0.036 | 54.7 | 52 |
| Single-shell blister B | PA25/AI45/PE30(IS) | AI20/PE15(IS) | 0.1 | 0.1 | 30 | 15 | 0.0045 | 100 | 100 |
| Double-shell blister B | PA25/PA25/AI45/ PE30(IS) | PA25/PA25/AI45/ PE30(IS) | 0.1 | 0.1 | 30 | 30 | 0.006 | 54.7 | 73 |
| Single-shell blister C | PA25/AI45/PETG35(IS) | AI20/HSL7(IS) | 0.2 | 2.8 | 35 | 7 | 0.0266 | 100 | 100 |
| Double-shell blister B | PA25/PET23/AI60/ PETG35(IS) | PA25/PET23/AI60/ PETG35(IS) | 0.2 | 0.2 | 35 | 35 | 0.014 | 54.7 | 29 |

*relative to the single-shell cavity referenced at 100%
IS: inside seal
HSL: heat-seal lacquer

TABLE 2

Size comparison calculation of single-shell blister with lid and double-shell blister according to the invention

| concept | length (mm) | width (mm) | depth (mm)[1] | volume (cm³) | cavity area (mm²) | cavity rel. to capsule length | cavity rel. to capsule width | cavity rel. to capsule area | cavity rel. to capsule volume | cavity area gain factor versus FP | volume gain factor versus FP |
|---|---|---|---|---|---|---|---|---|---|---|---|
| Capsule 00 (23.3 mm length and 8.5 mm diameter) | | | | | | | | | | | |
| Single-shell blister | 39 | 24.2 | 9.4 | 3.7 | 944 | 1.67 | 2.84 | 4.75 | 3.16 | | |
| Double-shell of the invention | 25.4 | 10.6 | 4.7 | 1.4 | 269 | 1.09 | 1.24 | 1.35 | 1.20 | 3.51 | 2.64 |
| Tablet: capsule 00 | 23.3 | 8.53 | — | 1.17 | 199 | | | | | | |

| concept | diameter (mm) | depth (mm)[1] | tablet area (mm²) | volume (cm³) | cavity area (mm²) | cavity rel. to tablet diameter | cavity rel. to tablet area | cavity rel. to tablet volume | cavity area gain factor versus FP | volume gain factor versus FP |
|---|---|---|---|---|---|---|---|---|---|---|
| tablet: round 9*3 mm2 | | | | | | | | | | |
| Single-shell blister | 14 | 3.6 | | 0.35 | 154 | 1.56 | 2.42 | 1.84 | | |
| Double-shell of the invention | 11 | 1.8 | | 0.25 | 95 | 1.22 | 1.49 | 1.32 | 1.62 | 1.40 |
| Tablet: round 9*3 mm2 | 9 | 3 | 64 | 0.19 | | | | | | |

[1]Forming depth

The invention claimed is:

1. Double-shell blister packaging for medicinal contents comprising one or more cavity(ies), wherein the ratio of the volume of the cavity(ies) to the volume of the medicinal content is comprised between 1.8 and 1, , said double-shell packaging being the assembly of a first and of a second multilayer structures sealed to each other via one or more seal layer(s), each multilayer structure comprising one or more aluminum layer(s) with a thickness of at least 20 μm, and two or more support layers, wherein said two or more support layers have a tensile strength at break measured in machine and transversal direction of 200 N/mm2 or more, and an elongation at break of 50% or more, measured according to EN ISO 527-3 published in 1995, sample type 2, part 1-6, each of said multilayer structures comprising cavities which, arranged face to face, enclose in use said medicinal content.

2. Blister packaging according to claim 1, wherein said one or more aluminium layer(s) is/are sandwiched between the two or more support layers.

3. Blister packaging according to claim 1, wherein the stress/strain curves measured on said support layer present a positive slope for the measurement of the strain hardening according to EN ISO 527-3 published in 1995, sample type 2, part 1-6.

4. Blister packaging according to claim 1, wherein the thickness of the one or more aluminium layer(s) within the one or more cavity(ies), due to the stretch cold forming process, represents at least 30% of the thickness of the one or more aluminium layer(s) in the multilayer structure in the periphery of said cavities.

5. Blister packaging according to claim 1, wherein said blister is of a tearable, push-trough or a peelable type comprising one or more seal layer(s) selected from the group consisting of heat-seal lacquer with a thickness of 15 μm or less, a seal-initiation temperature determined by welding trials of 125° C. or less, and a melting temperature determined by differential scanning calorimetry of 125° C. or less, measured under a heating speed of 20° C./min between 50 and 150° C. and represented by the peak maximum of the second run.

6. Blister packaging according to claim 1, wherein said blister is of a tearable, push-trough or a peelable type comprising one or more seal layer(s) comprising coextruded polymer films and extrusion coatings with a thickness of 50 μm or less, a seal-initiation temperature determined by welding trials of 135° C. or less, and a melting temperature determined by differential scanning calorimetry of 135° C. or less, measured under a heating speed of 20° C./min between 50 and 150° C. and represented by the peak maximum of the second run.

7. Blister packaging according to claim 1, wherein the seal layer for the peelable blister has a peel strength comprised between 1.2 and 10 N/15 mm.

8. Blister packaging according to claim 1, wherein said peelable seal layer comprises LLDPE, poly-1-butene and inorganic filler material.

9. Blister packaging according to claim 1, wherein the seal layer for the tearable or push-through blister type is selected from the group consisting of a linear low-density polyethylene of a density between 0.902 and 0.925 g/cm3, partially or entirely neutralized ionomer, EMA, EBA, polyethylene obtained by metallocene catalysis, ethylene vinyl acetate, polyethyleneterephtalate glycol.

10. Blister packaging according to claim 1, wherein said peelable seal layer for the peelable blister type comprises compositions selected from the group consisting of polyolefin blends and/or copolymers of modified ethylene acrylate, blends of linear low density polyethylene or polyethylene obtained by metallocene catalysis and polybutylene.

11. Blister packaging according to claim 1, wherein said peelable seal layer for the peelable blister comprises lacquer compositions selected from the group consisting of phenoxy resins, blends of copolymers of methacrylic ester, olefins and ethylidennorbornen as binder, blends of polybutylmetacrylate, polybutylethacrylate and acrylic resins as binder, tackifier based on alphamethylstyrene, maleic acid anhydride modified copolymers of vinylacetate and vinylchloride and water-based dispersions based on ethylenevinylacetate, ethylene acrylic acid and metacrylic acid and salts thereof.

12. Blister packaging according to claim 1, wherein said multilayer structures additionally comprise two or more adhesive or tie layers selected from the group consisting of EAA, ionomers, EMA and EBA.

13. Blister packaging according to claim 1, said packaging comprising weakening lines or tear notches in the polymer layer(s) on the top and/or on the bottom of said first and/or second multilayer structure(s), the weakening lines preserving the barrier effect of the aluminium layer.

14. Blister packaging according to claim 1, wherein the ratio of the volume of the cavity(ies) to the volume of the medicinal content is comprised between 1.6 and 1.1.

15. Blister packaging according to claim 1, wherein the ratio of the volume of the cavity(ies) to the volume of the medicinal content is comprised between 1.5 and 1.2.

16. Blister packaging according to claim 1, wherein the thickness is of at least 30μm.

17. Blister packaging according to claim 1, wherein the elongation at break is of 70% or more.

18. Blister packaging according to claim 5, wherein the thickness of the heat-seal lacquer is of 10 μm or less, the seal-initiation temperature is of 110° C. or less, and the melting temperature is of 120° C. or less.

19. Blister packaging according to claim 18, wherein the melting temperature is of 115° C. or less.

20. Blister packaging according to claim 6, wherein said thickness is 35 μm or less, the seal-initiation temperature is 120° C. or less, and the melting temperature is of 120° C. or less.

21. Blister packaging according to claim 20, wherein the melting temperature is of 115° C. or less.

22. Process for the manufacturing of the blister packaging according to claim 1, comprising the following steps:
   supplying a first and second multilayer structures comprising one or more aluminium layer(s) with a thickness of at least 20 μm, and two or more support layers having a tensile strength at break measured in machine and transversal direction of 200 N/mm2 or more, and an elongation at break of 50% or more, measured according to EN ISO 527-3 published in 1995, sample type 2, part 1-6, said multilayer structures having a multidirectional deformability of 35% or more;
   stretch-cold forming of said first and second multilayers to form one or more cavity(ies); - filling said one or more cavity(ies) of one of the first or second multilayer structure with the medicinal content;
   sealing the first and second multilayer structures face to face;
   cutting the sealed multilayer into blister packaging units;
   conditioning in over-pack boxes or bags.

23. Process according to claim 22, comprising an additional step of cutting a weakening line or a tear notch into the first and/or second multilayer structure(s) to allow a push-through opening or a tear opening of said blister packaging.

24. Process according to claim 23, wherein the cutting of a weakening line or a tear notch is performed by laser cutting through the polymer layer(s) on the top and/or the bottom of the first and/or second multilayer structure(s), the laser beam being stopped by the aluminium layer to keep a total gas barrier.

25. Process according to claim 22, wherein the thickness is of at least 30μm.

26. Process according to claim 22, wherein the elongation at break is of 70% or more.

* * * * *